No. 725,411. PATENTED APR. 14, 1903.
F. J. COMPLIMENT & J. O. ROBINSON.
AXLE GAGE.
APPLICATION FILED JAN. 24, 1903.
NO MODEL.
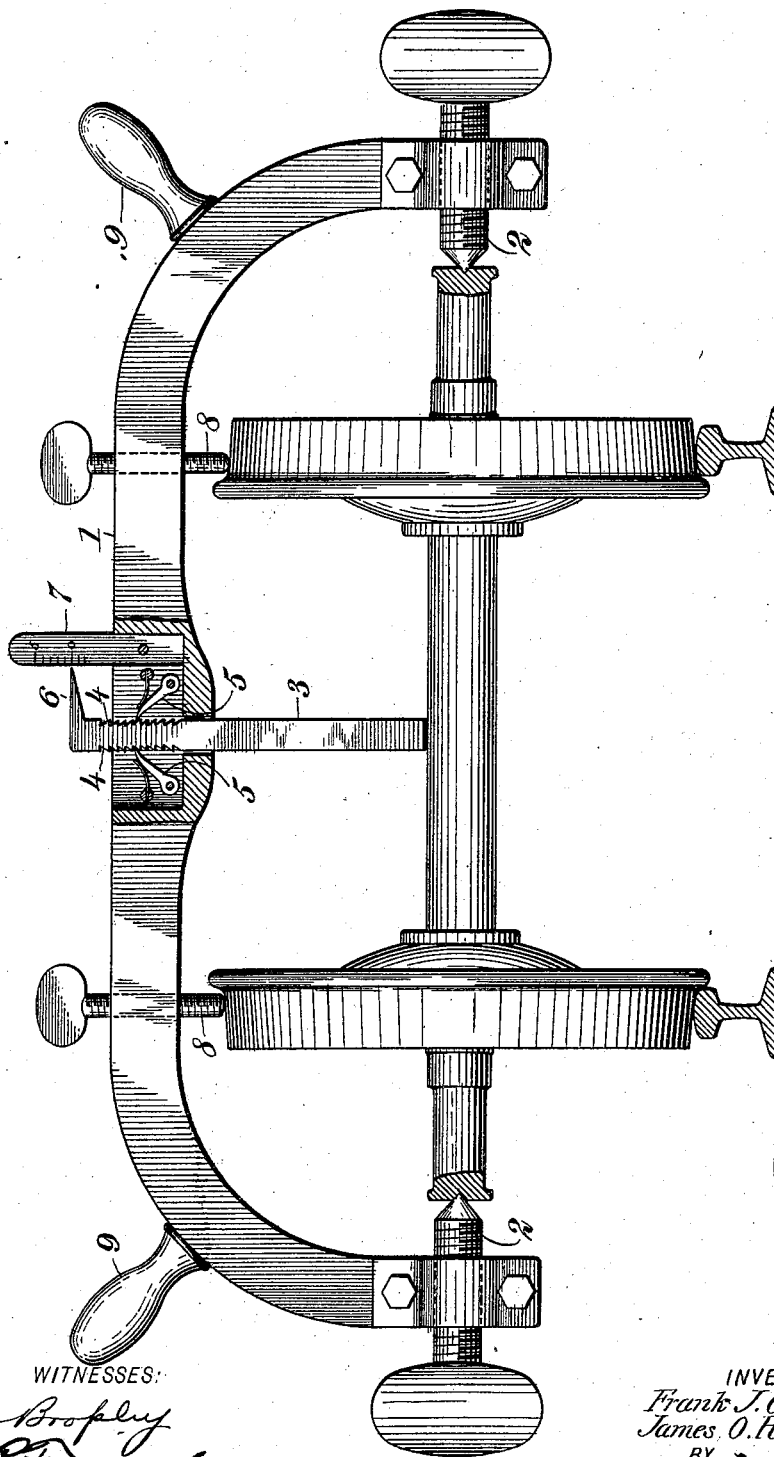
WITNESSES:
INVENTORS
Frank J. Compliment
James O. Robinson
BY
ATTORNEYS.

UNITED STATES PATENT OFFICE.

FRANK J. COMPLIMENT AND JAMES O. ROBINSON, OF IRONTON, OHIO, ASSIGNORS OF ONE-THIRD TO WILLIAM C. McKEE, OF IRONTON, OHIO.

AXLE-GAGE.

SPECIFICATION forming part of Letters Patent No. 725,411, dated April 14, 1903.

Application filed January 24, 1903. Serial No. 140,380. (No model.)

*To all whom it may concern:*

Be it known that we, FRANK J. COMPLIMENT and JAMES O. ROBINSON, citizens of the United States, and residents of Ironton, in the county of Lawrence and State of Ohio, have invented a new and Improved Axle-Gage, of which the following is a full, clear, and exact description.

This invention relates to improvements in devices for gaging railway-car axles to ascertain whether or not the axle has become bent or sprung by accident or by pressure in traffic, the object being to provide a device for this purpose of simple and inexpensive construction that may be easily handled by a train-inspector or other person.

We will describe an axle-gage embodying our invention and then point out the novel features in the appended claims.

Reference is to be had to the accompanying drawing, forming a part of this specification, in which the figure is a side elevation of an axle-gage embodying our invention.

The gage comprises a frame or yoke 1, in the downwardly-turned ends of which are screws 2 for engaging the lathe-centers of a car-axle. Movable vertically through an opening in the center of the frame or yoke is a gage-bar 3, designed to indicate the trueness of the axle. On opposite sides within the yoke or frame the said bar is provided with ratchet-teeth 4, designed to be engaged by spring-pressed pawls 5, and on the outer end of this bar is a pointer 6, movable along a graduated plate 7. The frame or yoke is provided with screws 8, designed to engage upon the periphery of the wheels to indicate whether or not they have slipped on the journals or axle.

In the operation the points of the screws 2 are to be inserted in the lathe-centers of the axle, and then by moving the wheels over a floor or a track and by holding the frame or yoke in its vertical position by means of handles 9 and while the screws 8 are engaged with the wheels and the rod 3 engages with the axle the said movement will indicate the trueness of the axle and wheels—that is, should the axle be bent or sprung, and provided the bar 3 shall have been placed in engagement with the lower portion, the said bar will be raised as the axle rotates and the amount of deflection will be indicated on the scale-plate 7.

Of course if the end of the rod 3 shall have been placed on the higher portion of the bent axle the lower portion will be indicated by the sight-opening between the bar and the axle.

Having thus described our invention, we claim as new and desire to secure by Letters Patent—

1. An axle-gage comprising a frame or yoke, centering-screws in the downwardly-extended ends of said frame or yoke, a vertically-movable bar arranged in the frame or yoke, a pointer on said bar, and a scale-plate along which the pointer is moved.

2. An axle-gage comprising a yoke, centering-screws in the downwardly-extended ends of said yoke, a gage-bar vertically movable in the said yoke, a spring-pressed pawl engaging with said bar, and a gage-plate along which the said bar is movable.

3. An axle-gage comprising a yoke, centering-screws in the downwardly-extended ends of said yoke, an axle-gage bar movable in said yoke, and wheel-gage devices adjustable in said yoke.

4. An axle-gage comprising a yoke, centering-screws in the downwardly-extended ends of said yoke, handles on the yoke, an axle-gage bar movable vertically through the yoke, pawls for holding said bar, a pointer on the bar, a gage-plate along which the pointer is movable, and wheel-gage screws carried in the yoke.

In testimony whereof we have signed our names to this specification in the presence of the subscribing witnesses.

FRANK J. COMPLIMENT.
JAMES O. ROBINSON.

Witnesses:
W. F. MURDOCK,
JAMES A. CANELL,
WILL F. MURDOCK,
CHARLES L. PIXLEY.